(12) United States Patent
Johnson et al.

(10) Patent No.: US 6,707,005 B1
(45) Date of Patent: Mar. 16, 2004

(54) PENETRATION FLUX

(75) Inventors: Matthew Q. Johnson, Powell, OH (US); Christopher M. Fountain, Upper Arlington, OH (US)

(73) Assignee: Edison Welding Institute, Inc., Columbia, OH (US)

( * ) Notice: Subject to any disclaimer, the term of this patent is extended or adjusted under 35 U.S.C. 154(b) by 0 days.

(21) Appl. No.: 09/958,126

(22) PCT Filed: Apr. 6, 2000

(86) PCT No.: PCT/US00/09346

§ 371 (c)(1),
(2), (4) Date: Oct. 4, 2001

(87) PCT Pub. No.: WO00/59674

PCT Pub. Date: Oct. 12, 2000

(Under 37 CFR 1.47)

Related U.S. Application Data (60) Provisional application No. 60/128,123, filed on Apr. 7, 1999.

(51) Int. Cl.[7] .................................................. B23K 35/24
(52) U.S. Cl. ................................ 219/146.31; 219/146.1
(58) Field of Search .......................... 219/146.31, 146.1, 219/146.23, 146.24, 145.1

(56) References Cited

U.S. PATENT DOCUMENTS

| | | |
|---|---|---|
| 2,043,960 A | 6/1936 | Jones et al. |
| 2,200,737 A | 5/1940 | Clapp |
| 2,415,149 A | 2/1947 | Sjoman |
| 2,636,103 A | 4/1953 | Vazquez-Arias |
| 3,001,898 A | 9/1961 | Johnson |
| 3,551,218 A | 12/1970 | Gurevich |
| 3,584,187 A | 6/1971 | Maietich et al. |
| 3,627,574 A | 12/1971 | Delong et al. |

(List continued on next page.)

FOREIGN PATENT DOCUMENTS

| | | |
|---|---|---|
| JP | 57-035605 A | 2/1982 |
| SU | 1362598 A | 12/1987 |
| SU | 1430377 A | 10/1988 |
| SU | 1482891 | 5/1989 |

OTHER PUBLICATIONS

O.E. Ostrovskii et al., The Effect of Activating Fluxes on the Penetration Capability of the Welding Arc and the Energy Concentration in the Anode Spot, Svar. Proiz., 1977, No. 3, pp. 3–4.

Eroshenko, L.E. et al., An Examination of the Glow of Anode Vapours for the Evaluation of the Technological Characteristics of the Arc Running in Argon, Avt. Svarka, 1979, No. 9, pp. 33–35.

Raimond, E.D. et al., Welding of High–Strength Steel Using Activating Fluxes in Powder Form, Svar. Proiz., 1973, No. 6, pp. 18–19 (also Weld. Prod., Jun. 1973, vol. 20(6) pp. 29–30).

(List continued on next page.)

*Primary Examiner*—M. Alexandra Elve
(74) *Attorney, Agent, or Firm*—Gallagher & Dawley Co.; David J. Dawsey, PE, E; Michael J. Gallagher, Esq.

(57) ABSTRACT

Deep penetration gas tungsten arc welds are achieved using weld penetration containing one or more compounds selected from the group of compounds consisting of a) a titanium oxide, b) nickel oxide, c) a metal silicide, and d) mixtures of these compounds a flux containing at least two titanium oxides, nickel oxide, and a manganese silicide is particularly useful for welding a side variety of maerial including nickel-based alloys and carbon and stainless steels. The flux can be applied as a paste, as part of a cored wire or rod coated on the exterior of a filler wire or rod. Alternatively, it can be mixed with a polymeric binder and applied to the weld zone as a hot melt, paint, tape, adhesive, rod, wire or a stick.

39 Claims, 2 Drawing Sheets

U.S. PATENT DOCUMENTS

| | | | |
|---|---|---|---|
| 3,731,868 A | | 5/1973 | Arikawa et al. |
| 3,849,211 A | | 11/1974 | Gurevich |
| 3,890,168 A | | 6/1975 | Shumway |
| 4,010,309 A | | 3/1977 | Peterson |
| 4,071,732 A | | 1/1978 | Tanaka et al. |
| 4,131,493 A | | 12/1978 | Gurevich et al. |
| 4,363,676 A | | 12/1982 | Crockett et al. |
| 4,439,498 A | | 3/1984 | Sadowski |
| 4,683,011 A | | 7/1987 | Weaver et al. |
| 4,800,131 A | | 1/1989 | Marshall et al. |
| 5,225,661 A | * | 7/1993 | Chai et al. ............. 219/145.22 |
| 5,525,163 A | | 6/1996 | Conaway et al. |
| 5,804,792 A | * | 9/1998 | Paskell ............... 219/137 WM |

OTHER PUBLICATIONS

Takeuchi, Y. et al., Effect of Bismuth on Weld Joint Penetrtion in Austenitic Stainless Steel, Welding Journal, 1986, 274s–280s.

Heiple, C.R. et al., Effects of SO2 Shielding Gas Additions on GTA Weld Shape, Welding Research Supplement, Jun. 1985, 159–s–162–s.

Simonik, A.G., Influence of Halides on the Penetration Effect in Argon–Arc Welding of Titanium Alloys, Svar. Proiz., 1974, No. 3. pp. 52–53.

Wen, J. et al., Technical Note: Surface Tension of 304 Stainless Steel under Welding Conditions, Welding Journal, May, 1986, 138s.

Lucas, W. et al., Effect of Cast to Cast Material Variations in TIG Welding—Literature Review, 1981, pp. 1–9.

Prilutskii, V.P. et al., The Endurance of Tungsten Elecctrodes Used for the Argon TIG Welding of Titanium with a Flux, Avt. Svarka, 1979, No. 10, pp. 41–43.

Eroshenko et al., Research into the Spectrum of the Arc Plasma During the Argon TIG Welding, with Flux, of Titanium, Avt. Svarka, 1980, No. 9. pp. 23–25.

* cited by examiner

PENETRATION FLUX

CROSS REFERENCE TO RELATED APPLICATION

This application is the United States national stage of PCT Application PCT/US00/09436 filed on Apr. 06, 2000 (published as WO 00/59674 on Oct. 12, 2000) which claims the benefit of U.S. Provisional Application 60/128,123 filed on Apr. 07, 1999 all of which is incorporated by reference as if completely written herein.

The U.S. Government has a paid-up license in this invention and the right in limited circumstances to require the patent owner to license others on reasonable terms as provided for by the terms of contract No. N00140-96C-0188 awarded by the United States Department of the Navy.

BACKGROUND OF THE INVENTION

1. Field

This application is related to gas tungsten arc welding and more particularly to a flux for substantially increasing weld penetration containing one or more compounds selected from the group of compounds consisting of a) a titanium oxide, b) a nickel oxide, c) a metal silicide, and d) mixtures of these compounds. A flux containing at least two titanium oxides, nickel oxide, and a metal silicide is particularly useful for welding a wide variety of materials including nickel-based alloys and carbon and stainless steels.

2. Background

The gas tungsten arc welding (GTAW) process is an arc welding process that uses an arc between a non-consumable tungsten electrode and the work piece to cause -localized coalescence of the base material. The GTAW process is used to produce high quality welds in a variety of materials. Applications include welding of sheet, plate, tube, and castings for use in aerospace, power generation, shipbuilding, and other industries. GTAW can be used with filler metals or consumable inserts to produce welds in thick sections. Autogenous welds (welds without filler metals) can be made in thin sections or for root passes in thick sections.

The primary limitation of the GTAW process is low productivity due to low deposition rates and shallow penetration. The inability of GTAW to produce welds with deep penetration limits the thickness of material that can be reliably joined to less than approximately 0.10 in (2.5 mm) thick. Materials greater than 0.1 in (2.5 mm) thick typically require weld joint preparation and multiple passes to fill the weld joint. GTAW welds are also affected by heat-to-heat compositional variations in the material being welded. While variable penetration is most often encountered in stainless steel and nickel-based alloys, this phenomenon occurs in other materials as well.

A method of increasing both the amount and consistency of penetration in gas tungsten arc (GTA) weldments is to apply a thin layer of flux to the surface of the part or joint to be welded prior to welding. The use of traditional fluxes for the GTAW process is not required since shielding and arc stabilization are provided by the use of an external shielding gas. Fluxes used for GTAW to improve penetration are inherently different than those used for soldering, brazing, or other arc welding processes since they neither clean the surface of the part nor protect the weld pool from oxidation.

The use of flux for increasing penetration in mild steel materials has been described by several authors in the former Soviet Union. An article by E. D. Raimond et al. titled "Welding of High Strength Steel Using Activating Fluxes in Powder Form" Svar. Proiz, No. 6, pp. 18–19, suggests that the use of Soviet Flux FS-71 increased GTAW penetration in steel by 50–100 percent No compositional details were given for the flux. A later article by O. E. Ostroviski entitled "The Effect of Activating Fluxes on the Penetration Capability of the Welding Arc and the Energy Concentration in the Anode Spot" Svar. Proiz, No. 3, pp.3–4, 1977, reveals that the composition of flux FS-71 is 57.3 percent $SiO_2$, 6.4 NaF, 13.6 $TiO_2$, 13.6 Ti, and 9.1 $Cr_2O_3$. Another paper by L. E. Eroshenko et al, titled "An Examiantion of the Glow of Anode Vapors for the Evaluation of the Technological Characteristics of the Arc Running in Argon, Avt. Svarka, 1979, No. 9, pp. 33–35, evaluated the enhanced penetration caused by fluorides of several alkali and alkaline-earth elements. The effects of individual fluorides were studied and the fluorides evaluated in the study were used as a basis for selecting components for titanium and steel GTAW fluxes. A similar approach to the Soviet flux design is described in U.S. Pat. No. 5,525,163 by H. R. Conaway et. al. They claim that the use of 7 to 59 percent LIF promotes penetration in 321 austenitic stainless steel. They infer that this ingredient will promote enhanced penetration in other materials such as carbon steel as well. Paskell describes a flux composed of TiO or $TiO_2$ (50%), $Cr_2O_3$ (40%) and $SiO_2$ (10%) in U.S. Pat. No. 5,804,792 that is used to increase the penetration in stainless steel.

The flux reported by Ostrovski (FS-71) and flux no.69 reported by Conaway (23.6 $Al_2O_3$, 39.4 LiF, 15.7 MgO, 5 $B_2O_3$, and 15.7 $Fe_2O_3$) were evaluated in the instant effort on Alloy 600 material. Neither flux spread well or produced consistently improved penetration above what was measured without flux. Additionally, these fluxes both contain fluorides which can increase the risk of corrosion in some environments and which generated a considerable amount of fluoride based fume which is can be hazardous as well. Additional experiments were conducted in the present effort to determine whether the addition of material such as $Cr_2O_3$ or $SiO_2$ or both as used by Paskell in U.S. Pat. No. 5,804,792 enhanced the penetration characteristics of the fluxes of the present invention detailed in Table 1 below. When $SiO_2$ (10 wt. %) or $Cr_2O_3$ (40 wt. %) or both (10 wt. % $SiO_2$ and 40 wt. % $Cr_2O_3$) were added to flux Ni106 of the present invention, weld penetration decreased by a factor of about 2 or more.

In order to overcome the various problems encountered with prior art fluxes and find new fluxes that substantially improve flux penetration, it is an object of the present invention to provide a flux composition for use with the GTA process that improves weld penetration in nickel-based alloys and a variety of steels including carbon and stainless steels.

It is an object of the present invention to reduce the cost of the GTA process by reducing the time and effort in joint preparation.

It is an object of the present invention to reduce the number of passes required in a multi-pass gas tungsten arc weld.

It is an object of the present invention to reduce the distortion of gas tungsten arc welds.

It is an object of the present invention to produce welds with mechanical properties that are not degraded through the use of the flux composition.

It is an object of the present invention to produce welds with a weld quality that is not degraded through the use of the flux composition.

It is an object of the present invention to provide a flux that is provided in a variety of conveniently useable forms such as a paint, adhesive, hot melt, rod, stick, or wire.

The foregoing and other objects, features and advantages of the invention will become apparent from the following disclosure in which one or more preferred embodiments of the invention are described in detail. It is contemplated that variations in procedures may appear to a person skilled in the art without departing from the scope of or sacrificing any of the advantages of the invention.

SUMMARY

The above objects are met in the present invention by using at least one compound selected from the group of compounds consisting of a) a titanium oxide, b) a nickel oxide, c) a metal silicide, and d) mixtures thereof. A flux consisting of any one of these compounds alone has been found to increase GTAW weld penetration in a wide variety of nickel-based, carbon and stainless steel materials. The titanium oxide can include any of the oxides of titanium including but not limited to titanium monoxide, titanium dioxide, and dititanium trioxide. Considerable weld penetration is achieved when a mixture of at least two titanium oxides, e.g., titanium monoxide and titanium dioxide, is used. For nickel-based alloys, a combination of titanium oxides and nickel oxide has found be quite effective with the addition of manganese silicide further improving weld quality.

In combination, these material appear to have a synergistic effect when employed in combination and in the following amounts: about 15 to about 50 weight % titanium oxide, about 10 to about 50 weight % titanium dioxide, 3 to about 15 weight % manganese silicide and about 20 to about 40 weight % nickel oxide. Two robust compositions applicable to a wide variety of materials including carbon and stainless steels and especially nickel-based alloys consist essentially of: a) about 23 weight % titanium monoxide, about 23 weight % titanium dioxide, about 23 weight % dititanium trioxide, about 23 weight % nickel oxide, and about 8 weight % manganese silicide and b) about 9 weight % manganese silicide about 30 weight % nickel oxide, about 18 weight % titanium monoxide, about 20 weight % titanium dioxide, and about 23 weight % dititanium trioxide.

Any of the above compositions are used by applying them to the weld zone for GTAW in a variety of ways. The fluxes can be mixed with a liquid carrier such as water, an alcohol, a ketone, or an ester among others to form a paste which is applied to the weld zone. They can be included in a cored wire or rod. Or they can be formed on the external surface of a filler wire or rod. One particularly attractive method of delivery is their combination with a wide variety of polymeric binders, both thermoset and thermoplastic including but not limited to polyolefins, vinyls, styrenics, acrylics, urethanes, epoxies, polyethers, polyamides, polyesters, polyimides, cellulosics, and urea and melamine formaldehydes to form 1) adhesives including hot melts and tapes, 2) water and solvent-based paints, 3) films, and 4) sticks, rods, and wires. When incorporated into adhesives such as hot melts and tapes, they can effectively hold the materials to be joined during the welding process.

The foregoing and other objects, features and advantages of the invention will become apparent from the following disclosure in which one or more preferred embodiments of the invention are described in detail and illustrated in the accompanying examples. It is contemplated that variations in compositions and their use in the welding process may appear to a person skilled in the art without departing from the scope of or sacrificing any of the advantages of the invention.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

One of the objects of the present invention is to provide weld penetration enhancing compounds that are used with welding processes such as gas tungsten arc welding to improve weld penetration. In some cases, these compounds are also capable of reducing heat-to-heat variations in penetration. These compounds contain several oxides of titanium and nickel oxide. The compounds consist of pure powders, although reduction of rutile or other titanium oxides can also serve to produce a similar combination of oxides. The particle sizes of the powders used in this invention were −325 mesh or finer.

These penetration-enhancing compounds can be applied by mixing the powders,; with a suitable carrier such as water, alcohol, ketones, or other carriers. The flux ingredients can also be included into a cored wire and introduced into the weld pool through wire additions without use of a carrier. Alternatively, these elements can be applied to the external surface of a filler wire and introduced into the weld pool. One particularly attractive method of flux delivery is combination with a wide variety of polymeric binders, both thermoset and thermoplastic including but not limited to polyolefins, vinyls, styrenics, acrylics, urethanes, epoxies, polyethers, polyamides, polyesters, polyimides, cellulosics, and urea and melamine formaldehydes to form 1) adhesives including hot melts and tapes, 2) water and solvent-based paints, 3) films, and 4) sticks, rods, and wires. Such forms allow for easy and convenient application and, in some instances, such as when formed as adhesives, they may be used to hold the work pieces in position during the welding process.

The primary purpose of these penetration-enhancing compounds is to improve penetration and reduce heat-to-heat variations in penetration. When compared to autogenous welds produced without flux, the penetration enhancing compounds of this invention have been shown to produce welds of comparable quality and reduce the cost of welding through simplification of joint preparation, reduced consumption of filler wire, and reduced distortion.

A unique composition of GTAW fluxes has been developed. While these fluxes were developed primarily for use on Ni-based alloys, substantial increases in penetration when using the fluxes described in this document have been observed in other applications such as stainless steel applications. For this invention, flux compositions contain one or more compounds selected from the group consisting of the oxides of titanium, a nickel oxide, and a metal silicide. As used here, the terms "oxides or oxide of titanium" or "titanium oxide or oxides" are used generically to include specific titanium oxide compounds and their mixtures including but not limited to: 1) titanium monoxide (TiO), 2) titanium dioxide ($TiO_2$), 3) dititanium trioxide ($Ti_2O_3$), 4) titanium trioxide ($TiO_3$), and 5) mixtures of these specific titanium oxides. Nickel oxide refers to various oxides of nickel such as NiO and $Ni_2O_3$ and combinations thereof. And a metal suicide refers generally to any silicide compatible with the work piece alloy. A variety of metal silicides are available from Alfa Aesar, a Johnson Matthey Company, Ward Hill, Mass. Typically transition metal suicides are used. Manganese silicide, generally referred to as $MnSi_2$ was obtained from Alfa Aesar with an indicated composition of $Mn_{15}Si_{26}$.

Any one of these ingredients, when applied individually, increases weld penetration considerably. However, a combination of one or more Ti oxides and especially two or more Ti oxides along with Ni oxide promote substantial (more than 200 percent) penetration in a range of materials when compared to penetration achieved without the use of a flux.

Over 150 flux compositions were evaluated for nickel-based alloy applications. Most of the development and testing of these fluxes was conducted on Inconel™ 600 base material, although limited evaluation of these fluxes on other nickel-based alloys and other materials such as stainless steel was conducted. Table 1 shows some of the compositions of the fluxes of this invention. The approach of using a combination of titanium oxides along with nickel oxide is unique when compared to the other GTAW fluxes. Examples given below demonstrate that these fluxes offer a substantial improvement in penetration in a range of nickel-based alloys not attainable using other flux compositions.

Flux Ni106 represents a robust flux composition that will work on a range of materials. The range of effective compositions was determined by use of design of experiments to be: one or more of: TiO: 15–50 wt. %, $TiO_2$: 10–50 wt. %, $Ti_2O_3$: 15–50 wt. %; and NiO: 20–40 wt. % and optionally $Mn_{15}Si_{26}$: 3–15 wt. %. A combination of two or more Ti oxides with nickel oxide was especially effective while a flux containing 29.7 NiO, 17.7 TiO, 22.8 $Ti_2O_3$, 9.4 $Mn_{15}Si_{26}$ and 20.4 $TiO_2$ (wt. %) was most preferred.

EXAMPLE 1

GTAW Flux Composition Ni106 used for Alloy 600, Alloy 625, and Alloy 718

For this example, plates with a nominal thickness of 0.280 inch (7.1 mm) were used. Bead-on-plate welds were produced with and without the use of GTAW flux Ni106. The welding conditions used are listed in Table 2. For each alloy, welding current was increased while maintaining a constant travel speed and arc length. In each alloy evaluated the use of Ni106 GTAW flux resulted in consistent penetration increases of more than 200 percent. The penetration for each current level was measured by cross sectioning the weld normal in the direction of welding and polishing/etching the specimen so that the weld fusion line was clearly revealed.

Figure 1:
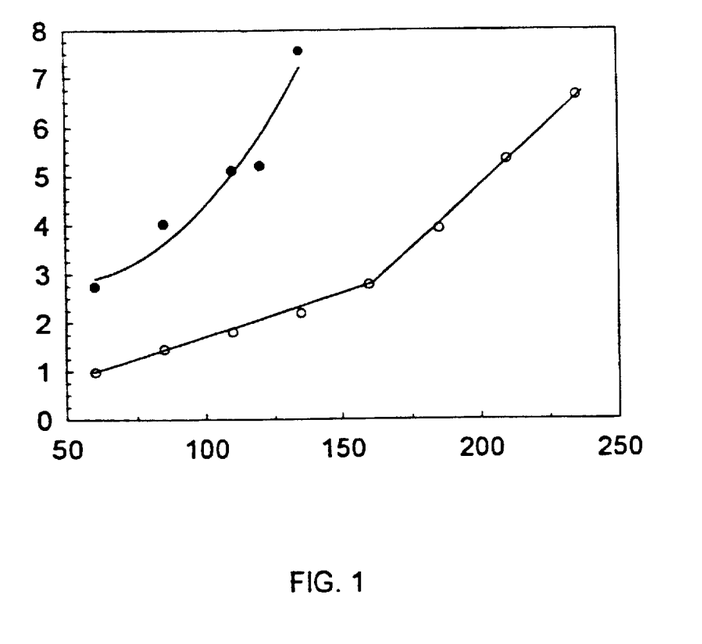
FIG. 1 is a graph illustrating the effect of GTAW flux Ni106 (Table 1) on penetration in 7.7 mm thick Alloy 718 material. The travel speed was 3.0 in/min (7.6 cm/min) and the arc voltage was varied to maintain a constant arc length of 1/16 in (1.6 mm). The open circles indicate penetration without a flux while filled circles indicate penetration using the Ni106 flux. Penetration is given in mm along the vertical axis; current in amps is given on the horizontal axis.
Figure 2:
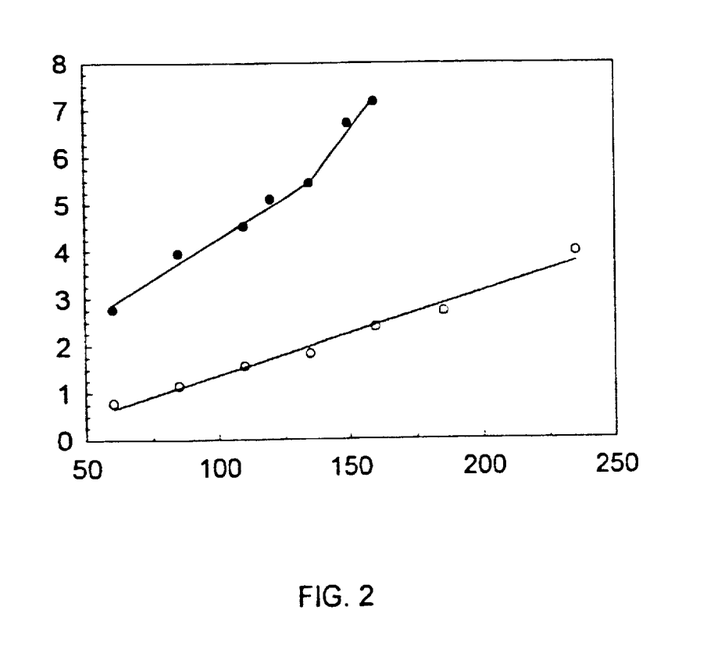
FIG. 2 is a graph illustrating the effect of GTAW flux Ni106 (Table 1) on penetration in 7.7 mm thick Alloy 625 material. The travel speed was 3.0 in/min (7.6 cm/min) and the arc voltage was varied to maintain a constant arc length of 1/16 in (1.6 mm). The open circles indicate penetration without a flux while filled circles indicate penetration using the Ni106 flux. Penetration is given in mm along the vertical axis; current in amps is given on the horizontal axis.
Figure 3:
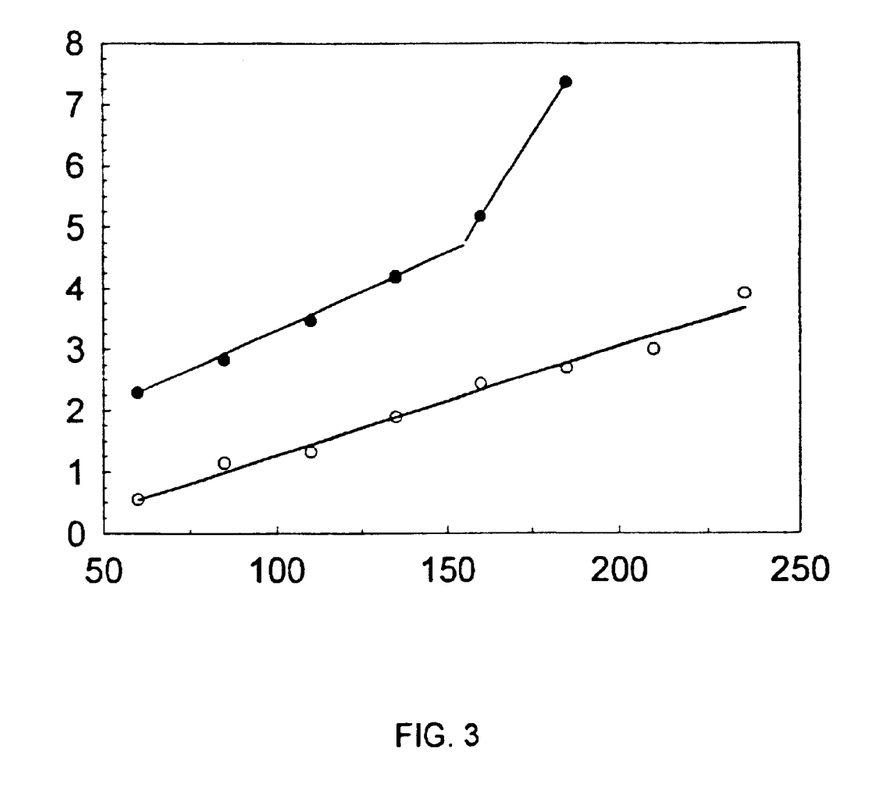
FIG. 3 is a graph illustrating the effect of GTAW flux Ni106 (Table 1) on penetration in 7.5 mm thick Alloy 600 material. The travel speed was 3.0 in/min (7.6 cm/min) and the arc voltage was varied to maintain a constant arc length of 1/16 in (1.6 mm). The open circles indicate penetration without a flux while filled circles indicate penetration using the Ni106 flux. Penetration is given in mm along the vertical axis; current in amps is given on the horizontal axis.

FIGS. 1–3 show the effectiveness of flux Ni106 in promoting increased penetration in thick sections (>0.2 5 inch; >0.64 mm) of nickel based alloys. These results show that Ni106 is capable of improving penetration even at low welding currents. Manganese silicide was added to the mixture of titanium oxides and nickel oxide to improve root bead consistency and improve flux spreading.

The flux reported by Ostrovski (FS-71), Svar. Proiz. No. 3. pp. 3–4, 1977, and flux no. 69 reported by Conaway (23.6 $Al_2O_3$, 39.4 LiF, 15.7 MgO, 5 $B_2O_3$, and 15.7 $Fe_2O_3$), U.S. Pat. No. 5,525,163, were evaluated on Alloy 600 material. Neither flux spread well or produced consistently improved penetration above what was measured with and without flux. Additionally, these fluxes contain fluorides that increase the risk of corrosion in certain environments and generate a considerable amount of hazardous fluoride based fume.

Additional experiments were conducted to determine whether or not the addition of $Cr_2O_3$, $SiO_2$, or both $Cr_2O_3$ and $SiO_2$ as used by Paskell (U.S. Pat. No. 5,804,792) enhanced the penetration characteristics of Ni106. These material alone or in combination, remarkably reduced weld penetration by a factor of more than two.

EXAMPLE 2

Flux Ni54 (see Table 1) produced substantial increases in weld penetration. The use of Ni54 more than doubled penetration in Alloy 600, Alloy 625, and Alloy 690. Although these titanium oxide ingredients (titanium monoxide and titanium dioxide) by themselves do not provide a doubling in weld penetration, when the two are used in combination, they provide a synergistic effect that allows maintenance of complete penetration in thicker Ni based alloys at substantially lower heat inputs when compared to welding without flux. Subsequent testing of these fluxes show that a substantial increase in penetration can be achieved in a number of other nickel-based alloys such as Alloy 625, Alloy 690, Alloy 718, Hastalloy X, austenitic stainless steel, and carbon steel among others.

TABLE 1

Chemical Composition (wt. %) of Selected Fluxes

| Flux ID | TiO | $TiO_2$ | $Ti_2O_3$ | NiO | $Mn_{15}Si_{26}$ |
|---|---|---|---|---|---|
| Ni54 | 33 | 33 | | | |
| Ni59 | 25 | 25 | 25 | 25 | |
| Ni106 | 23.1 | 23.1 | 23.1 | 23.1 | 7.5 |

TABLE 2

Summary of welding parameters used in flux evaluation trials.

| Variable | Value |
|---|---|
| Torch position | 1G |
| Current | Variable-reported in Figures or Text (DCSP) |
| Voltage | 9–9.5V to give 1/16" (1.6 mm) arc length |
| Travel speed | 3 inches/min (7.6 cm/min) |
| Shielding gas/flow rate | Argon/30 cfh (0.85 m³/hr) |
| Backing gas/flow rate | Argon/15 cfh (0.42 m³/hr) |
| Electrode | 3/32" (2.4 mm) 2% thoriated |
| Electrode preparation | 45° included angle, 0.02 in (0.5 mm) blunt |

It is possible that changes in configurations to other than those shown could be used but that which is shown if preferred and typical. The present invention may suitably comprise, consist of, or consist essentially of a titanate as herein defined. The invention illustratively disclosed herein suitably may be practiced in the absence of any element which is not specifically disclosed herein.

It is therefore understood that although the present invention has been specifically disclosed with the preferred embodiment and examples, modifications to the design concerning compound selection with respect to metal silicides such as manganese silicide, nickel oxide, flux application methods, and additional additives and amounts of components will be apparent to those skilled in the art and such modifications and variations are considered to be equivalent to and within the scope of the disclosed invention and the appended claims.

I claim:

1. A composition for use as a welding penetration flux comprising:
    a) a flux: comprising:
        1) at least one oxide of titanium,
        2) a nickel oxide, and
        3) a metal silicide; and
    b) a polymeric binder mixed with said flux to provide a form for application to a weld zone.

2. The welding penetration flux of claim 1 further comprising at least two oxides of titanium.

3. The welding penetration flux of claim 1 wherein said oxide of titanium is selected from the group of oxides of titanium consisting of:
    a) titanium monoxide,
    b) titanium dioxide,
    c) dititanium trioxide, and
    d) mixtures thereof.

4. The welding penetration flux of claim 1 wherein said oxide of titanium is selected from the group of oxides of titanium consisting of:
    a) about 15 to about 50 weight % titanium monoxide,
    b) about 10 to about 50 weight % titanium dioxide,
    c) about 15 to about 50 weight % dititanium trioxide, and
    d) mixtures thereof.

5. The welding penetration flux of claim 4 further comprising about 3 to about 15 weight % manganese silicide.

6. The welding penetration flux of claim 5 wherein said nickel oxide is present in an amount of about 20 to about 40 weight %.

7. The welding penetration flux of claim 6 consisting of about 23 weight % titanium monoxide, about 23 weight % titanium dioxide, about 23 weight % dititanium trioxide, about 23 weight % nickel oxide, and about 8 weight % manganese silicide.

8. The welding penetration flux of claim 1 wherein said oxide of titanium is selected from the group of oxides of titanium consisting of:
    a) about 18 weight % titanium monoxide,
    b) about 20 weight % titanium dioxide,
    c) about 23 weight % dititanium trioxide, and
    d) mixtures thereof.

9. The welding penetration flux of claim 8 further comprising about 9 weight %a manganese silicide.

10. The welding penetration flux of claim 9 wherein said nickel oxide is present in an amount of about 30 weight %.

11. The welding penetration flux of claim 10 wherein said oxide of titanium is selected as a mixture comprising about 18 weight % titanium monoxide, about 20 weight % titanium dioxide, and about 23 weight % dititanium trioxide.

12. The welding penetration flux of claim 1 mixed with a flux carrier.

13. The welding penetration flux of claim 1 included in a cored wire or rod.

14. The welding penetration flux of claim 1 formed on the external surface of a filler wire or rod.

15. The welding penetration flux of claim 1 wherein said form is an adhesive, a hot melt, a tape, a film, a paint, a rod, a wire or a stick.

16. A welding penetration flux comprising at least two titanium oxides and at least one of the group of compounds consisting of:
    a) a nickel oxide,
    b) a metal silicide, and
    c) mixtures thereof.

17. The welding penetration flux of claim 16 wherein said titanium oxides are selected from a group of titanium oxides consisting of:
    a) titanium monoxide,
    b) titanium dioxide,
    c) dititanium trioxide, and
    d) mixtures thereof.

18. The welding penetration flux of claim 17 wherein said titanium oxides are a mixture of said titanium oxides comprising titanium monoxide and titanium dioxide.

19. The welding penetration flux of claim 18 comprising said titanium monoxide, said titanium dioxide, said nickel oxide, and said metal silicide.

20. The welding penetration flux of claim 19 comprising about 15 to about 50 weight % titanium monoxide and about 10 to about 50 weight % titanium dioxide.

21. The welding penetration flux of claim 20 wherein said metal silicide is a Manganese silicide comprising about 3 to about 15 weight % manganese silicide.

22. The welding penetration flux of claim 21 comprising about 20 to about 40 weight % nickel oxide.

23. The welding penetration flux of claim 16 mixed with a flux carrier.

24. The welding penetration flux of claim 16 included in a cored wire or rod.

25. The welding penetration flux of claim 16 included on the external surface of a filler wire or rod.

26. The welding penetration flux of claim 16 further comprising a polymeric binder mixed with said flux to form a polymeric binder flux composition.

27. The welding penetration flux of claim 16 wherein sad polymeric binder flux composition is in the form of an adhesive, a hot melt, a tape, a film, a paint, a rod or a stick.

28. A welding penetration flux composing at least one of the group of compounds consisting of:

a) a titanium oxide,
b) a nickel oxide,
c) a metal suicide, and
d) mixtures thereof in a polymeric binder.

29. The welding penetration flux of claim 28 comprising at least two titanium oxides.

30. The welding penetration flux of claim 28 wherein said titanium oxides are selected from a group of titanium oxides consisting of:
a) titanium monoxide,
b) titanium dioxide,
c) dititanium trioxide, and
d) mixtures thereof.

31. The welding penetration flux of claim 30 wherein said titanium oxides are a mixture comprising titanium monoxide and titanium dioxide.

32. The welding penetration flux of claim 31 comprising said titanium monoxide, said titanium dioxide, said nickel oxide, and said metal silicide.

33. The welding penetration flux of claim 32 comprising about 15 to about 50 weight % titanium monoxide and about 10 to about 50 weight % titanium dioxide.

34. The welding penetration flux of claim 33 wherein said metal silicide is a manganese silicide comprising about 3 to about 15 weight % manganese silicide.

35. The welding penetration flux of claim 34 comprising about 20 to about 40 weight % nickel oxide.

36. The welding penetration flux of claim 28 mixed with a flux carrier.

37. The welding penetration flux of claim 28 included in a cored wire or rod.

38. The welding penetration flux of claim 28 formed on the external surface of a filler wire or rod.

39. The welding penetration flux of claim 28 wherein said polymeric binder flux composition is in the form of an adhesive, a hot melt, a tape, a film, a paint, a rod or a stick.

* * * * *

UNITED STATES PATENT AND TRADEMARK OFFICE
CERTIFICATE OF CORRECTION

PATENT NO. : 6,707,005 B1  Page 1 of 1
APPLICATION NO. : 09/958126
DATED : March 26, 2004
INVENTOR(S) : Matthew Q. Johnson and Christopher M. Fountain It is certified that error appears in the above-identified patent and that said Letters Patent is hereby corrected as shown below:

In the Specification:

At column 5, line 35, delete the word "suicide" and replace with the word --silicide--

At column 5, line 38, delete the word "suicide" and replace with the word --silicide--

In the Claims:

Column 8, at line 66, delete the word "composing" and replace with the word --comprising--

Column 9, at line 3, delete the word "suicide" and replace with the word --silicide--

Signed and Sealed this

Twentieth Day of January, 2009

JON W. DUDAS
*Director of the United States Patent and Trademark Office*

UNITED STATES PATENT AND TRADEMARK OFFICE
CERTIFICATE OF CORRECTION

PATENT NO. : 6,707,005 B1
APPLICATION NO. : 09/958126
DATED : March 16, 2004
INVENTOR(S) : Matthew Q. Johnson and Christopher M. Fountain Page 1 of 1

It is certified that error appears in the above-identified patent and that said Letters Patent is hereby corrected as shown below:

In the Specification:

At column 5, line 35, delete the word "suicide" and replace with the word --silicide--

At column 5, line 38, delete the word "suicide" and replace with the word --silicide--

In the Claims:

Column 8, at line 66, delete the word "composing" and replace with the word --comprising--

Column 9, at line 3, delete the word "suicide" and replace with the word --silicide--

This certificate supersedes the Certificate of Correction issued January 20, 2009.

Signed and Sealed this

Tenth Day of February, 2009

JOHN DOLL
*Acting Director of the United States Patent and Trademark Office*